United States Patent [19]

Duncombe et al.

[11] 4,416,851
[45] Nov. 22, 1983

[54] NUCLEAR FUEL FOR LIQUID METAL COOLED NUCLEAR REACTORS

[75] Inventors: Edward Duncombe, Hale; Charles P. Gratton, Dorchester; John Adamson, Blanford, all of England

[73] Assignee: United Kingdom Atomic Energy Authority, England

[21] Appl. No.: 841,568

[22] Filed: Oct. 12, 1977

[30] Foreign Application Priority Data

Oct. 18, 1976 [GB] United Kingdom ............... 43220/76

[51] Int. Cl.³ ............................................. G21C 3/16
[52] U.S. Cl. ..................................... 376/399; 376/444
[58] Field of Search ................... 176/19 R, 40, 78, 61; 376/399, 444

[56] References Cited

U.S. PATENT DOCUMENTS

| | | | |
|---|---|---|---|
| 3,060,111 | 10/1962 | Sherman et al. | 176/19 R |
| 3,164,529 | 1/1965 | Waine et al. | 176/78 |
| 3,344,036 | 9/1967 | Haslam et al. | 176/78 |
| 3,368,945 | 2/1968 | Keller et al. | 176/78 |
| 3,459,925 | 8/1969 | Goosey et al. | 176/19 R |
| 3,677,893 | 7/1972 | Huebotter et al. | 176/40 |
| 3,899,390 | 8/1975 | Klein et al. | 176/19 R |
| 3,935,064 | 1/1976 | Yellowlees | 176/61 |
| 4,050,985 | 9/1977 | Yant et al. | 176/40 |
| 4,053,359 | 10/1977 | Pennell et al. | 176/40 |

FOREIGN PATENT DOCUMENTS

| | | | |
|---|---|---|---|
| 2021837 | 10/1970 | Fed. Rep. of Germany | 176/19 R |
| 2302445 | 8/1973 | Fed. Rep. of Germany | 176/65 |
| 2165522 | 7/1973 | France | 176/19 R |
| 50-32717 | 10/1975 | Japan | 176/19 R |

OTHER PUBLICATIONS

PMC-74-01, (4/74) pp. 86-92 Reactor Systems P. W. Pickson.

*Primary Examiner*—Sal Cangialosi
*Attorney, Agent, or Firm*—Larson and Taylor

[57] ABSTRACT

In a cluster of nuclear fuel rods cooled by liquid metal an obstruction to coolant flow results in overheating in the wake of the obstruction. By the provision of open ended heat transfer tubes in the flow channels, a guaranteed supply of coolant is maintained and this supply holds the temperature to below saturation. Heat transfer via the tubes is highly efficient and ensures that a sufficient temperature rise occurs at the cluster exit to provoke a response from the outlet temperature transducer sensing average temperature.

3 Claims, 4 Drawing Figures

NUCLEAR FUEL FOR LIQUID METAL COOLED NUCLEAR REACTORS

BACKGROUND OF THE INVENTION

This invention relates to nuclear fuel for liquid metal cooled nuclear reactors comprising a cluster of closely spaced parallel nuclear fuel pins shrouded by an annular wrapper. The cluster, its supporting means and the wrapper are commonly referred to as a fuel assembly and, in use, an assembly occupies, or defines, a coolant channel with the longitudinal axis of the cluster coincident with the axis of the channel. The elongated coolant flow paths between adjacent fuel pins are referred to as sub-channels and these sub-channels are conventionally long and narrow for nuclear physics reasons and to provide a compact core. In the unlikely event of a local restriction to flow occurring in one or more of the sub-channels, parts of the fuel pin surface lying in the wake of the restriction may be incompletely cooled. The consequential local temperature rise may have a deleterious effect on the fuel pin cladding. Such a local temperature rise may not be detectable early by the temperature sensitive transducer, which is located at the coolant channel outlet and senses an average value of outlet temperature. The latter is a parameter not affected by a local temperature rise because coolant in the blockage wake probably tends to form local eddies, decoupled from the main stream of the main coolant flow.

The aim of the present invention is to ensure that should a flow restriction develop then the resultant local temperature rise will be held at a safe value at least until the outlet temperature transducer responds to the defective condition.

SUMMARY OF THE INVENTION

According to the invention liquid cooled nuclear reactor comprises a liquid metal cooled nuclear reactor core having a coolant channel through which coolant is passed along sub-channels between parallel fuel pins to extract heat therefrom and a transducer responsive to average temperature at the outlet end of the channel to monitor correct cooling of the fuel characterised in that a number of open ended heat transfer tubes are dispersed across the channel flow section to extract heat from any local region of coolant in the sub-channels whose consequent temperature rise is not otherwise communicated to the transducer by the coolant flowing through the sub-channels in contact with the fuel pins. The local regions as mentioned above are the regions in which the coolant locally becomes decoupled from the main stream of coolant which flows throughout the coolant channel and generally occurs in the wake of a main channel flow restriction or blockage.

The invention also resides in a method of monitoring a liquid metal coolant channel in the aforesaid manner and also comprises a liquid metal cooled nuclear reactor having the aforesaid means of gauging the temperature of a coolant channel.

DESCRIPTION OF THE DRAWINGS

In order that the invention may be better understood one embodiment thereof will now be described with reference to the accompanying drawings in which.

DESCRIPTION OF THE PREFERRED EMBODIMENT

Figure 1:
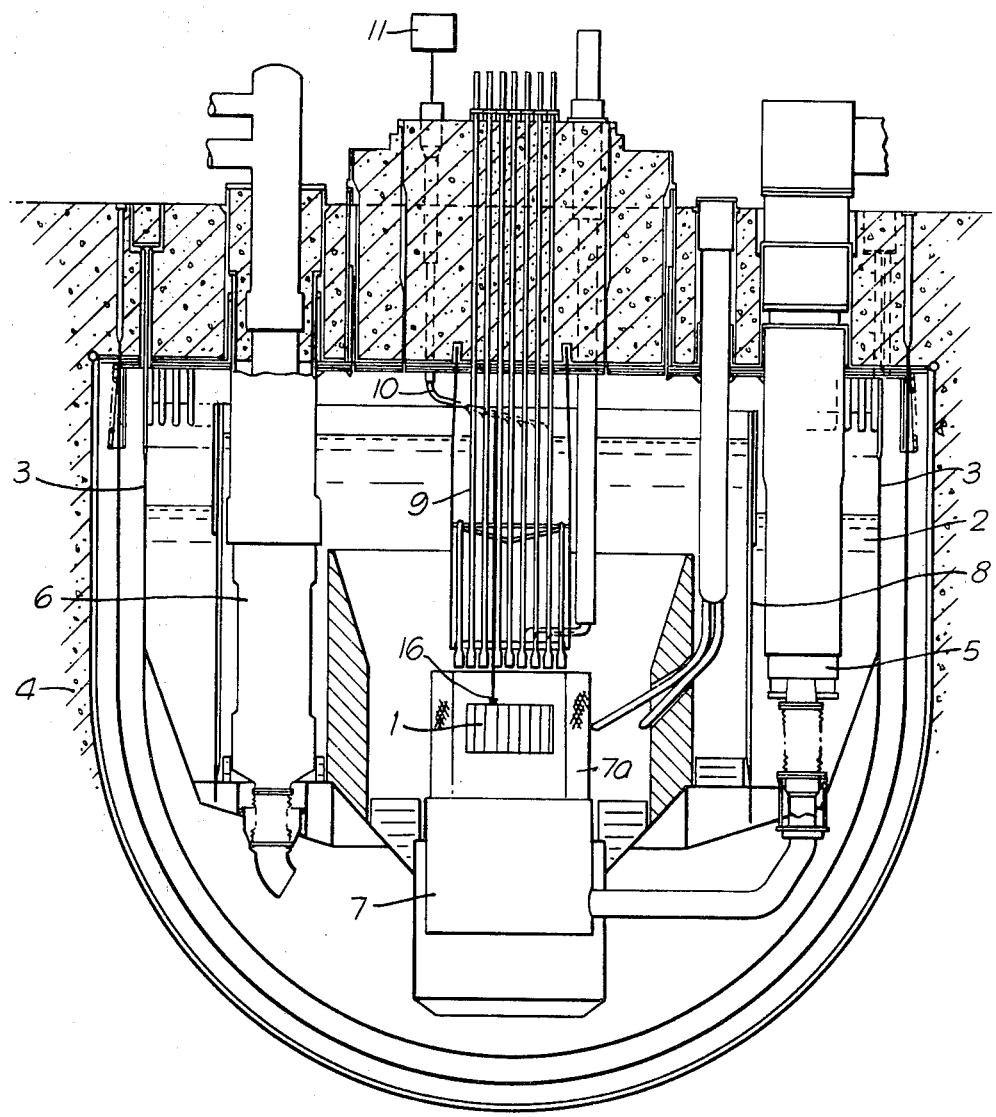
FIG. 1 is general view in cross-section of a liquid metal cooled nuclear reactor.
Figure 2:
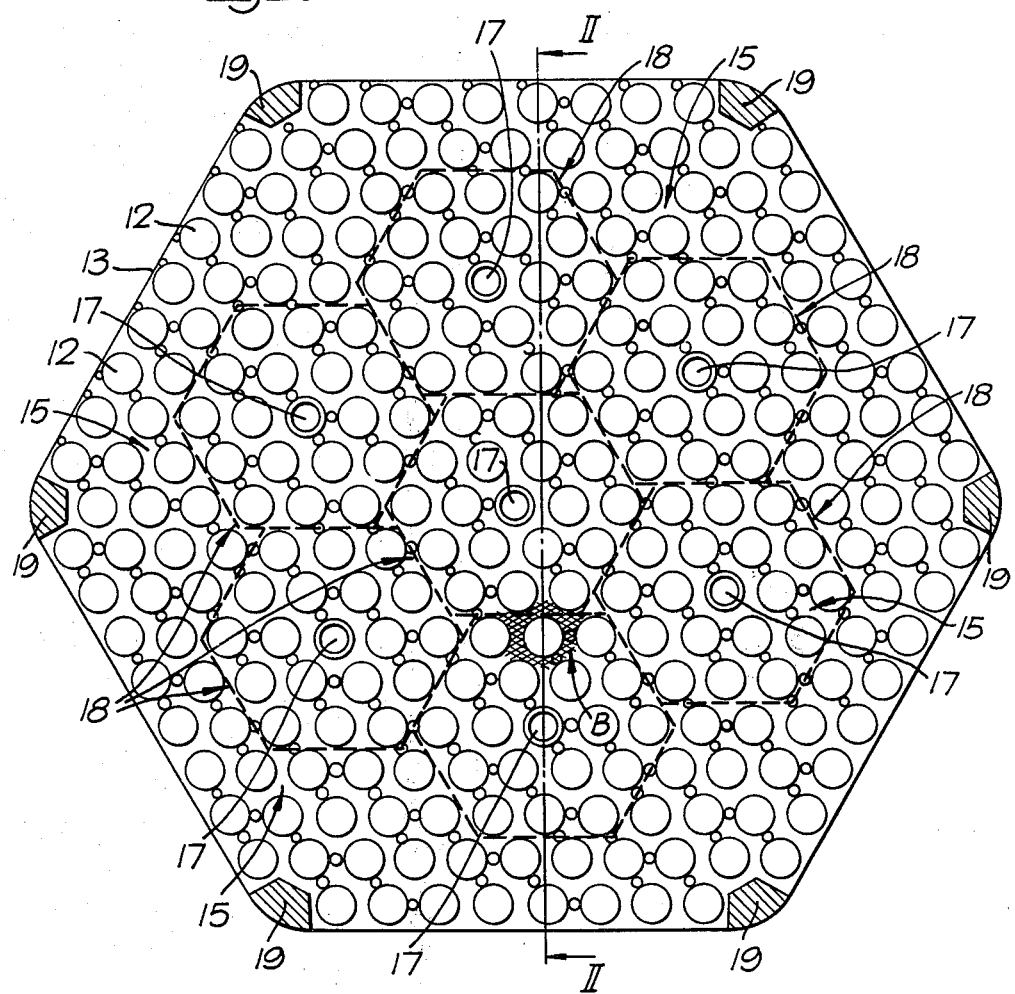
FIG. 2 is a cross-section through a reactor coolant channel taken transverse to its longitudinal axis.
Figure 3:
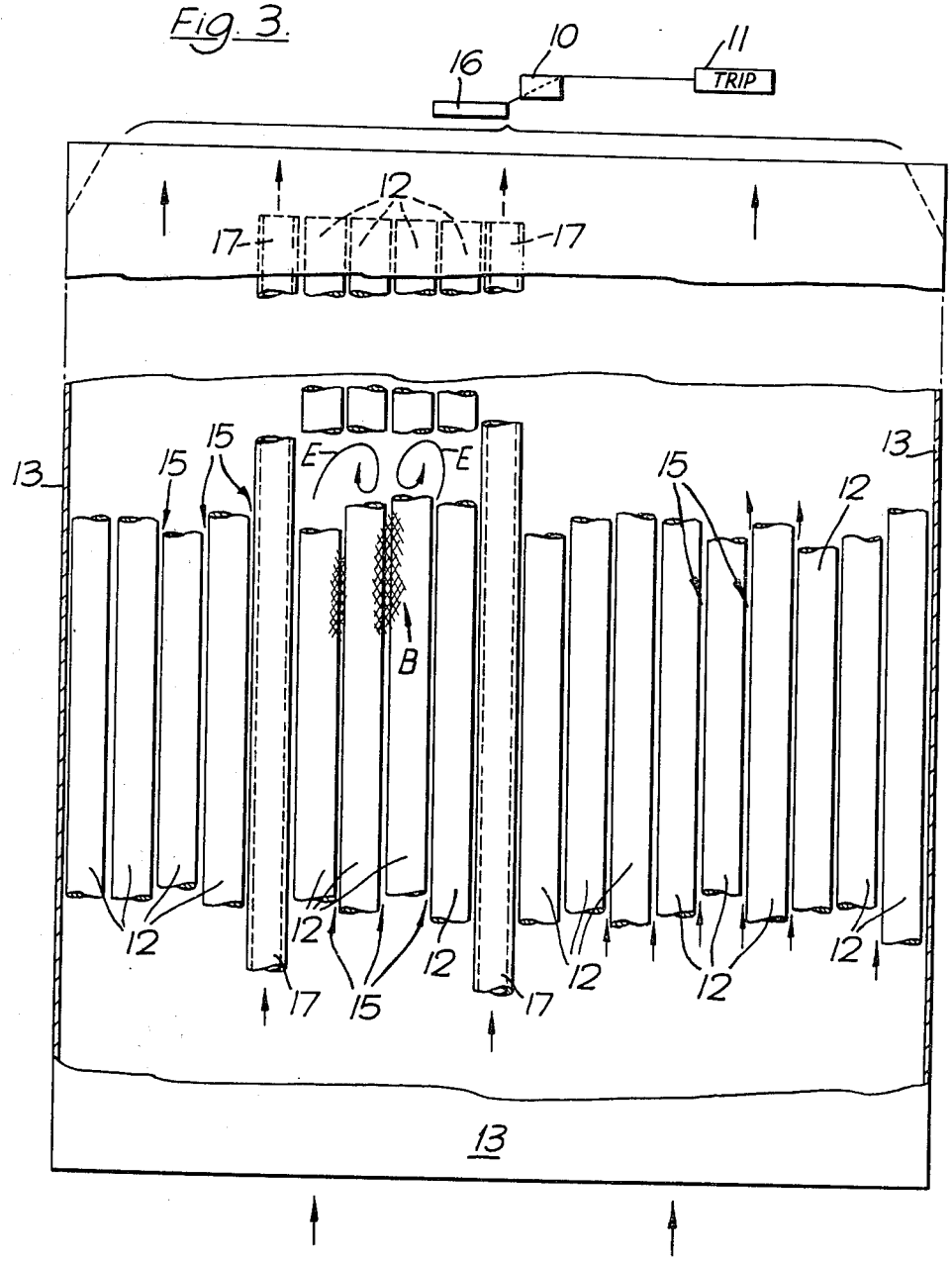
FIG. 3 is a diagrammatic cross-section on the line III—III of FIG. 2.
Figure 4:
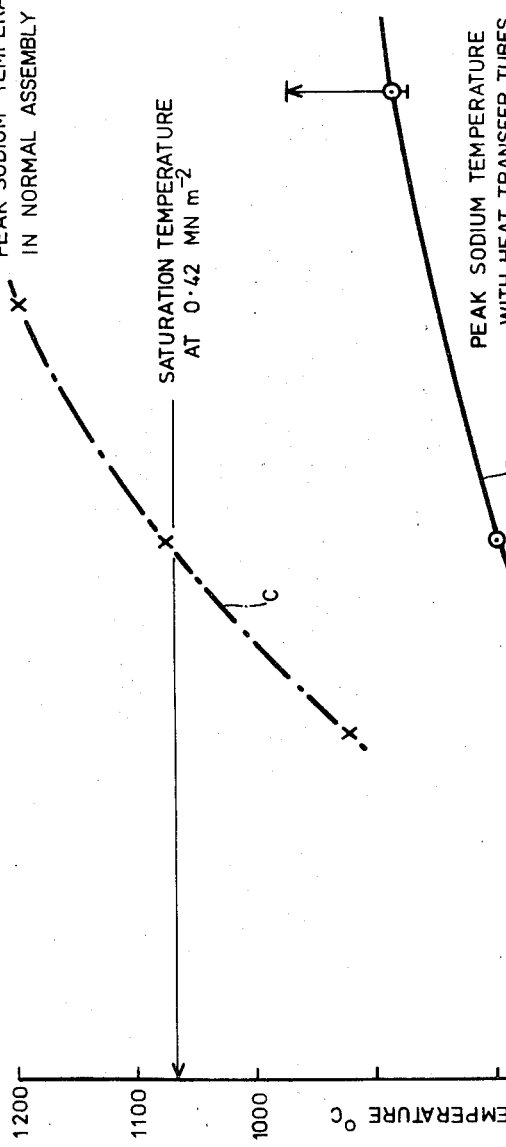
FIG. 4 is a graph which demonstrates the effect of the invention.

FIG. 1 illustrates a liquid metal cooled fast breeder nuclear reactor having a core 1 composed of fuel assemblies submerged in a pool 2 of liquid sodium coolant in a primary vessel 3. The primary vessel is suspended from the roof of a containment unit 4 and there is provided a plurality of coolant pumps 5 and heat exchangers 6, only one of each of pump and heat exchangers being shown. The fuel assemblies are mounted on a diagrid 7 housed with the heat exchangers in a core tank 8 whilst the pumps 5, which deliver coolant to the diagrid, are disposed outside of the core tank. The core fuel assemblies upstand from this digrid 7 in closely spaced side-by-side array and the assemblies are embraced by a barrel 7a to provide peripheral restraint. Control rods 9 and instrumentation channels 10 penetrate the roof of the vault. The fuel assemblies each include a central fuel section shown in FIG. 2 which comprises a bundle of elongate fuel pins 12 enclosed within a tubular wrapper 13 of hexagonal cross-section. The wrapper 13 thus defines a coolant channel which is sub-divided into sub-channels by the spaced fuel pins. The fuel pins 12 are positioned and held parallel to one another and to the axis of the tubular wrapper by grid means (not shown) which define, say, 284 lattice positions. In contemporary designs, one sees a nuclear fuel pin 12 supported at each lattice position with the fuel pin axis parallel to one another and to the longitudinal axis of the wrapper 13. The spaces between the fuel pins 12 thus form the sub-channels 15 through which liquid metal, e.g. sodium, coolant admitted to the lower open end of the wrapper 13 passes, extracting heat from the pins. The heat coolant is delivered from the upper end of the wrapper whereat a transducer 16 senses its average temperature, or a second order effect of average temperature. The transducer 16 yields a measure of the correct cooling of the assembly and transmits its response via instrumentation 10 to a trip amplifier 11 connected via actuators (not shown) to control rods 9. If however a flow restriction or a partial blockage occurs in one or more of the sub-channels, as indicated at the shaded area B in FIGS. 2 and 3, discrete regions of the fuel pins in the wake of the blockage will be less well cooled, for it has been found experimentally that the smooth axial flow of coolant will be disturbed possibly to the extent that re-circulation flow eddies E (FIG. 3) are formed. Heat transfer between the coolant in the eddies and the bulk of the coolant passing along the adjacent sub-channels is very limited with the result that the eddies may reach saturation temperature and near boiling. At the same time the outlet transducer 16 which gives an indication of the average outlet temperature, will be unable to respond to the higher temperature obtaining in the wake of the blockage. A local region of the fuel pins could therefore be put at risk without a warning signal from the transducer. To meet this contingency, a number of spaced lattice positions in the fuel assembly are given over to open ended heat transducer tubes 17 which are exteriorly similar in shape to fuel pins. The function of the tubes 17 is to ensure that a guaranteed supply of through coolant is supplied across the flow secton at selected positions. Should a flow blockage occur, then the region in the wake of the blockage will be adequately cooled independently of the bulk coolant flow. It has been found that the heat transfer between coolant in a coolant tube 17 and a wake region is orders of magnitude greater than between re-circulating flow and the remainder of the coolant.

To this end seven coolant tubes 17 have been inserted at lattice positions each in the centre of a group of sub-channels bounded by a dotted line 18. Each group contains eighteen fuel pins and if a blockage occurs in the region of any one group, heat from the wake is carried away by coolant flowing through the adjacent tube 17 and boiling is prevented or postponed. Should the blockage extend over a significant number of sub-channels then other coolant tubes 17 will contribute a cooling effect from the other localities where temperature peaks occur. These will ensure that the coolant temperature in the sub-channels remains below saturation and cause a rise in the mean temperature at the outlet end of the coolant channel. The transducer 16 responsive to mean temperature will then indicate that the safety threshold has been exceeded and transmit a warning to the trip amplifier 11. Remedial action is then taken.

Calculatons can show that 20 percent of a wrapper flow area can become blocked without a trip but the rate of increase of the transducer signal with blockage fraction rises progressively beyond this so that well before a fraction that would induce boiling and fuel failure is reached, the temperature rise will be detectable and the transducer will provoke a trip. The graph at FIG. 3 demonstrates this effect on a hypothetical fuel assembly. The graph has an abscissa scaled in axisymmetric blockage fraction of the total flowpath, the left hand ordinate is scaled in peak sodium (coolant) temperature, anywhere in the channel. The right hand ordinate relates to average outlet temperature and relates the abscissa to the lowermost curve A illustrating the case where heat transfer tubes are disposed amongst the fuel pins. The middle curve B plots the peak sodium temperature against blockage fraction with heat transfer tubes and top curve C without heat transfer tubes (i.e. without the invention). Curve C cuts the saturation temperature line at about 20% blockage fraction. The curve B shows a substantial reduction in peak temperature with coolant tubes although the temperature will certainly rise to saturation if further points are plotted. The curve B shows that at 20% blockage the increase in average outlet temperature would not be detectable by the outlet transducer since there are other aspects of reactor operation (such as fuel burn up, charge/discharge, control rod movements) which could induce transducer response changes of comparable magnitude. But above 30% this average temperature rises more rapidly until at, say 50% the increase would certainly be detectable.

As stated above it is convenient to make the coolant tubes exteriorly similar to the fuel pins but they may otherwise be made with highly efficient heat transfer characteristics. For example the tubes may have thin walls with profiled surfaces e.g. spirally fluted and formed of metal of higher conductivity than the stainless steel normally used for fuel pin cladding.

If a serious risk of blockage in the periphery of the fuel pin cluster exists and there is no flowing coolant over the outside of the wrapper then further coolant tube may be substituted for peripheral fuel pins. Alternatively the longitudinal stiffening ribs 19 on the wrapper may be fluid cooled. An acoustic transducer may be located near the outlet end of the coolant channel which is acoustically coupled to the coolant tubes to detect noise generated somewhere along the coolant channel. Such noise may originate from incipient boiling or fluid density changes.

However the presence of the coolant tubes has the following principal effects:

i. the onset of local boiling is delayed and ii. safe operation of the assembly may be continued even with a sub-channel blockage large enough to reduce the total sub-assembly flowrate; whilst the temperature rise at the sub-assembly outlet, which eventually occurs, becomes easily detectable.

We claim:

1. A liquid metal cooled nuclear reactor having at least one coolant channel defined by the tubular wall of a fuel element wrapper, within which are supported a plurality of spaced, parallel, nuclear fuel pins so as to define sub-channels between the pins, a coolant inlet at one end of the channel and an outlet at the other, a transducer responsive to average outlet temperature of the coolant leaving the channel, and a plurality of open-ended heat transfer tubes empty of fuel dispersed amongst the sub-channels parallel to the channel axis and providing a guaranteed supply of coolant in case of overheating in the wake of a blocked sub-channel whereby heat generated in said wake is transferred via said tubes to contribute to the value of the average outlet temperature registered by said transducer.

2. A method of safeguarding a nuclear reactor coolant channel defined by the tubular wall of a fuel element wrapper and traversed by liquid metal coolant from the consequences of channel partial blockage and the local overheating in the wake of the blockage which resides in setting a number of open ended heat transfer tubes which are empty of fuel in sub-channels between the fuel pins so as to form guaranteed supplies of coolant along a number of the sub-channels and conduct heat from local regions of the channel which experience a temperature rise above the average outlet temperature and transmit heat from said region to an outlet transducer.

3. A nuclear fuel assembly for a liquid metal cooled nuclear reactor, said assembly comprising a tubular-walled fuel element wrapper defining a channel for coolant flow, a plurality of nuclear fuel pins supported in said wrapper in a spaced parallel array and coaxial with the axis of the channel formed by the wrapper and defining sub-channels between the pins for coolant flow, a plurality of open-ended heat transfer tubes empty of fuel and dispersed among said sub-channels with the axis of said tubes coaxial with the channel axis, a coolant inlet at one end of the channel and a coolant outlet at the other, and a transducer means for monitoring the average outlet temperature of coolant leaving the channel.

* * * * *